United States Patent [19]
Takaki et al.

[11] Patent Number: 5,473,388
[45] Date of Patent: Dec. 5, 1995

[54] PAL CHROMA SIGNAL DEMODULATING APPARATUS

[75] Inventors: Kazuki Takaki, Tokyo; Yoshio Wada, Yokohama, both of Japan

[73] Assignee: Kabushiki Kaisha Toshiba, Kawasaki, Japan

[21] Appl. No.: 200,434

[22] Filed: Feb. 23, 1994

[30] Foreign Application Priority Data

Feb. 23, 1993 [JP] Japan .................................. 5-033593

[51] Int. Cl.$^6$ .............................. H04N 9/66; H04N 5/455
[52] U.S. Cl. ............................................ 348/640; 348/727
[58] Field of Search ........................... 329/318; 348/640, 348/727, 638, 726; H04N 9/66, 5/455

[56] References Cited

U.S. PATENT DOCUMENTS

| | | | |
|---|---|---|---|
| 3,715,469 | 2/1973 | Tamaru et al. | 348/640 |
| 3,899,740 | 8/1975 | Unkauf et al. | 329/318 |
| 4,799,212 | 1/1989 | Mehrgardt . | |
| 4,918,393 | 4/1990 | Yokosuka et al. | 329/318 |

FOREIGN PATENT DOCUMENTS

| | | |
|---|---|---|
| 0117374 | 9/1984 | European Pat. Off. . |
| 0511682 | 11/1992 | European Pat. Off. . |
| 2535126 | 4/1984 | France . |
| 1288123 | 9/1969 | Germany . |
| 3201684 | 9/1983 | Germany . |
| 0025246 | 2/1980 | Japan ............... 358/23 |

| | | |
|---|---|---|
| 1515408 | 6/1978 | United Kingdom . |

OTHER PUBLICATIONS

Special Edition of Telefunken–Zeitung, Jun. 1966, Selected Papers II, PAL a Variant of the NTSC Colour Television System, Dr. W. Bruch, pp. 1.7–1.9, "PAL With Averaging Through A Delay Line (Standard–PAL Decoder)".

Primary Examiner—Victor R. Kostak
Attorney, Agent, or Firm—Oblon, Spivak, McClelland, Maier & Neustadt

[57] ABSTRACT

A signal demodulator apparatus comprises: an input terminal (11) for inputting an external signal; a delay line (12) connected to the input terminal, for outputting a first delay signal obtained by delaying the external signal by a predetermined time; a phase corrector (13) responsive to the first delay signal outputted by the delay line, for correcting phase of the first delay signal on the basis of a phase difference detection signal and outputting the first phase-corrected delay signal as a second delay signal; and a phase difference detector (16, 15, 19, 20) for detecting a phase difference between the second delay signal outputted by said phase corrector and the external signal inputted through the input terminal and for outputting the phase difference detection signal to the phase corrector to correct the phase difference to a predetermined value. Whenever the delay time of the delay signal disperses due to a manufacturing error or a change with the lapse of time of the delay line (12), it is possible to automatically correct an offset of the phase difference from a normal value.

4 Claims, 2 Drawing Sheets

PAL CHROMA SIGNAL DEMODULATING APPARATUS

BACKGROUND OF THE INVENTION

The present invention relates to a signal demodulating apparatus.

As a signal demodulating apparatus related to the present invention, a PAL (phase alternation line) signal demodulating apparatus will be described hereinbelow by way of example, with reference to FIG. 4. In the PAL signal demodulating apparatus shown in FIG. 4, capacitors C1 and C2, a resistor R1, a variable resistor R3, a tank coil L1 and a coil L2 are provided as external parts at the periphery of a delay line 12 (e.g., a glass delay line). The capacitor C2 and the variable resistor R3 are connected in series between an input terminal 32 (to which a PAL chroma signal is inputted) and a node N3. The node N3 is directly connected to one input terminal of the delay line 13 and to the other input terminal thereof via the coil L2.

With respect to two output terminals of the delay line 12, on the other hand, a node N1 is connected to one output terminal and a node N2 is connected to the other output terminal thereof. Further, the node N1 is grounded via the capacitor C1. The tank coil L1 and the resistor R1 are connected in parallel to each other between the nodes N1 and N2. The node N2 is connected to an output terminal 31. In the above-mentioned signal demodulating apparatus, a PAL chroma signal inputted through the input terminal 32 is outputted from the output terminal 31 as a delay signal after having been delayed by about 64 μsec (which corresponds to one horizontal line).

In the above-mentioned signal demodulating apparatus, the delay time of the delay line 12 inevitably disperses due to manufacturing error. The dispersion of the delay time has been so far regulated manually product by product by adjusting the values of the externally connected parts, for instance by changing the resistance value of the variable resistor R3 and the inductance L of the tank coil L1, thus causing an increase in the manufacturing cost thereof. In addition, although the delay time changes with the lapse of time, the abovementioned signal demodulating apparatus cannot cope with a change caused by the aged deterioration.

SUMMARY OF THE INVENTION

Accordingly, it is the object of the present invention to provide a signal demodulating apparatus which can regulate the delay time automatically.

To achieve the above-mentioned object, the present invention provides a signal demodulator apparatus, comprising: an input terminal for inputting an external signal; delaying means connected to said input terminal, for outputting a first delay signal obtained by delaying the external signal by a predetermined time; a phase corrector responsive to the first delay signal outputted by said delaying means, for correcting phase of the first delay signal on the basis of a phase difference detection signal and outputting the first phase-corrected delay signal as a second delay signal; and a phase difference detector for detecting a phase difference between the second delay signal outputted by said phase corrector and the external signal inputted through said input terminal and for outputting the phase difference detection signal to said phase corrector to correct the phase difference to a predetermined value.

In the signal demodulating apparatus according to the present invention, although there inevitably exists an error in the delay time of the delaying means, it is possible to automatically regulate the dispersion of the delay time to a predetermined value by detecting the phase difference between the second delay signal obtained by the phase corrector and the external signal inputted through the input terminal, by correcting the first delay signal phase by the phase corrector so that the phase difference can be regulated to the predetermined value, and by outputting the phase-corrected second delay signal.

DETAILED DESCRIPTION OF THE PREFERRED EMBODIMENTS

Figure 1:
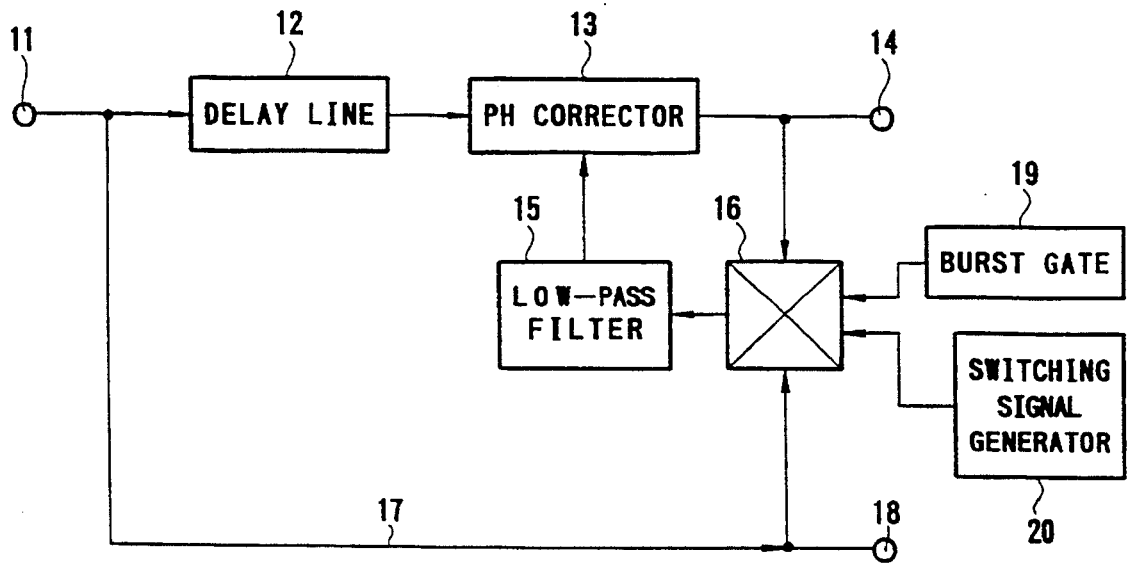
FIG. 1 is a block diagram showing an embodiment of the signal demodulating apparatus according to the present invention.

One embodiment of the signal demodulating apparatus according to the present invention will be described hereinbelow with reference to the attached drawings. A signal demodulating apparatus of the present invention is constructed as shown in FIG. 1. In the drawing, a delay line 12 for delaying a signal by one horizontal line and a phase corrector 13 are connected in series between an input terminal 11 for inputting a PAL chroma signal and an output terminal 14 for outputting a delay signal. Further, another output terminal 18 for outputting the PAL chroma signal as a direct signal is connected to the input terminal 11.

Further, two input terminals of a multiplier 16 are connected the two output terminals 14 and 18, respectively. An output terminal of a burst gate circuit 19 and an output terminal of a switching pulse signal generator 20 are both connected to two control terminals of the multiplier 16, respectively. An output of the multiplier 16 is connected to an input terminal of a low-pass filter 15, and an output terminal of the low-pass filter 15 is connected to a control terminal of the phase corrector 13.

The PAL chroma signal is applied to the input terminal 11. The direct signal is outputted from the output terminal 18 through a signal line 17. Further, the delay signal is delayed by one horizontal line through the delay line 12, and further the phase of the delay signal is corrected through the phase corrector 13 before outputted from the output terminal 14.

The direct signal inputted through the input terminal 11 and delay signal corrected through the phase corrector 13 are both applied to the multiplier 16. The burst signals of both the direct and delay signals are compared with each other by multiplying the direct signal by the delay signal with the multiplier 16. The compared result is inputted to the control terminal of the phase corrector 13 through the low-pass filter 15. The phase corrector 13 corrects the lead or lag in phase of the delay signal according to the phase comparison result of the burst signal between the direct and delay signals. The corrected delay signal is outputted from the output terminal 14.

Figure 2:
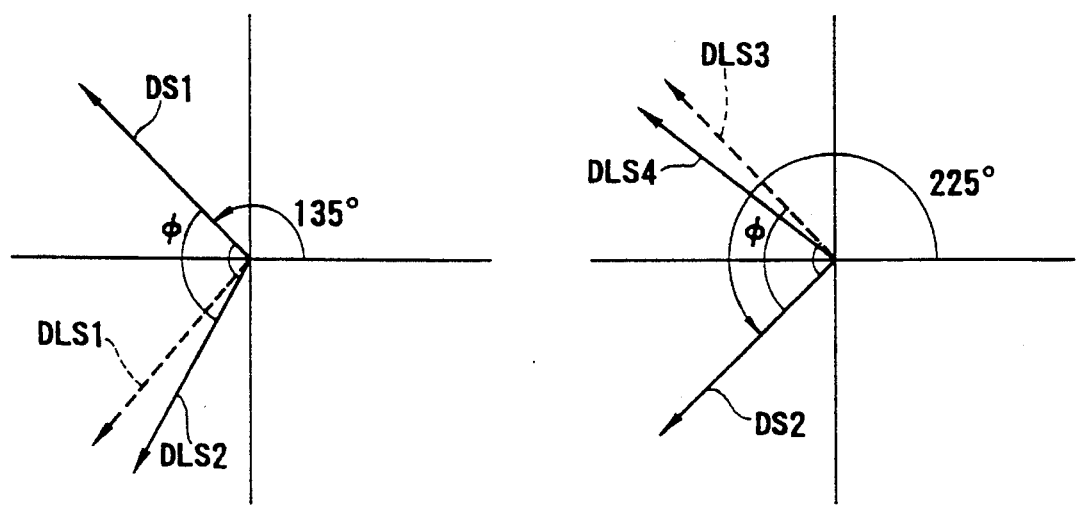
FIG. 2(a) is a graphical representation showing a phase difference between a direct signal and a delay signal obtained when the burst signal of the direct signal is 135 degrees in phase.
FIG. 2(b) is a graphical representation showing a phase difference between a direct signal and a delay signal obtained when the burst signal of the direct signal is 225 degrees in phase.

Here, the polarity of the comparison result in the burst signal between the direct and delay signals is reversed by the multiplier 16 as follows: FIG. 2(a) shows the phase relationship in the burst signal between the direct signal DS1 and the delay signal DLS1 of when the phase of the direct signal DS1 is 135 degrees and FIG. 2(b) shows the phase relationship in the burst signal between the direct signal DS2 and the delay signal DLS3 of when the phase of the direct signal DS2 is 225 degrees, respectively.

In the case where the burst signal of the direct signal DS1 is 135 degrees in phase as shown in FIG. 2(a), the phase difference $\phi$ between the burst signal of the direct signal DS1 and the burst signal of the normal delay signal DLS1 (represented by a dashed line) is 90 degrees. However, if the delay time is longer than a predetermined normal delay time and therefore the phase of the burst signal of the delay signal DLS2 (represented by a solid line) leads, the difference in phase between both becomes larger than 90 degrees. In this case, therefore, the phase corrector 13 corrects the phase of the delay signal DLS2 so as to lagged. That is, the polarity of the comparison result outputted by the multiplier 16 is reversed to positive (+), for instance.

On the other hand, in the case where the burst signal of the direct signal DS2 is 225 degrees in phase as shown in FIG. 2(b), the phase difference $\phi$ between the burst signal of the direct signal DS2 and the burst signal of the normal delay signal DLS3 (represented by a dashed line) is 90 degrees. In the case where the phase of the burst signal of the delay signal DLS4 (represented by a solid line) leads, however, the difference in phase between both becomes smaller than 90 degrees. In this case, therefore, the polarity of the comparison result outputted by the multiplier 16 is reversed to negative (−), for instance. Here, however, when the comparison results of two horizontal lines are averaged, since the phase difference becomes zero, the phase correction is not made. Accordingly, when the direct signal is 225 degrees in phase, a positive (+) signal is to be outputted by the multiplier 16, in the same way as with the case where the phase difference is 135 degrees.

As described above, in order to reverse the polarity of the output of the multiplier 16 for each horizontal line, a signal for determining the timing of the burst signal and further a signal for switching the polarity at the timing of one horizontal line (i.e., ½ fh (horizontal line frequency)) are applied to the multiplier 16 from the burst gate 19 and from the switching pulse signal generator 20, respectively.

In contrast with this, when the delay time is shorter than a predetermined time and thereby the phase of the delay signal lags, the polarity is reversed as follows: in the case where the direct signal is 135 degrees in phase, since the phase difference between the delay signal and the direct signal is smaller than 90 degrees, the polarity of the output of the multiplier 16 is determined to be negative (−), and in the case where the direct signal is 225 degrees in phase, since the phase difference between the delay signal and the direct signal is larger than 90 degrees, the polarity of the output of the multiplier 16 is switched to negative (−).

Figure 4:
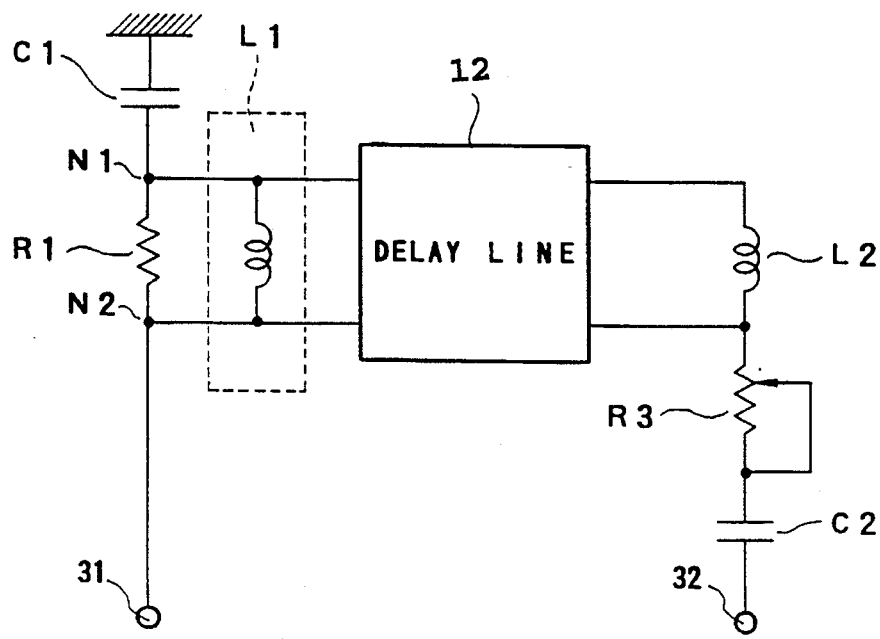
FIG. 4 is a block diagram showing another signal demodulating apparatus related to the present invention.

As described above, in the present invention, whenever the delay time of the delay signal disperses due to a manufacturing error or a change with the aged deterioration of the delay line 12, it is possible to automatically correct an offset of the phase difference from a normal value. Accordingly, it is unnecessary to manually adjust the electrical values of parts such as the variable resistor or tank coil as shown in FIG. 4, with the result that it is possible to reduce the manufacturing cost thereof.

Figure 3:
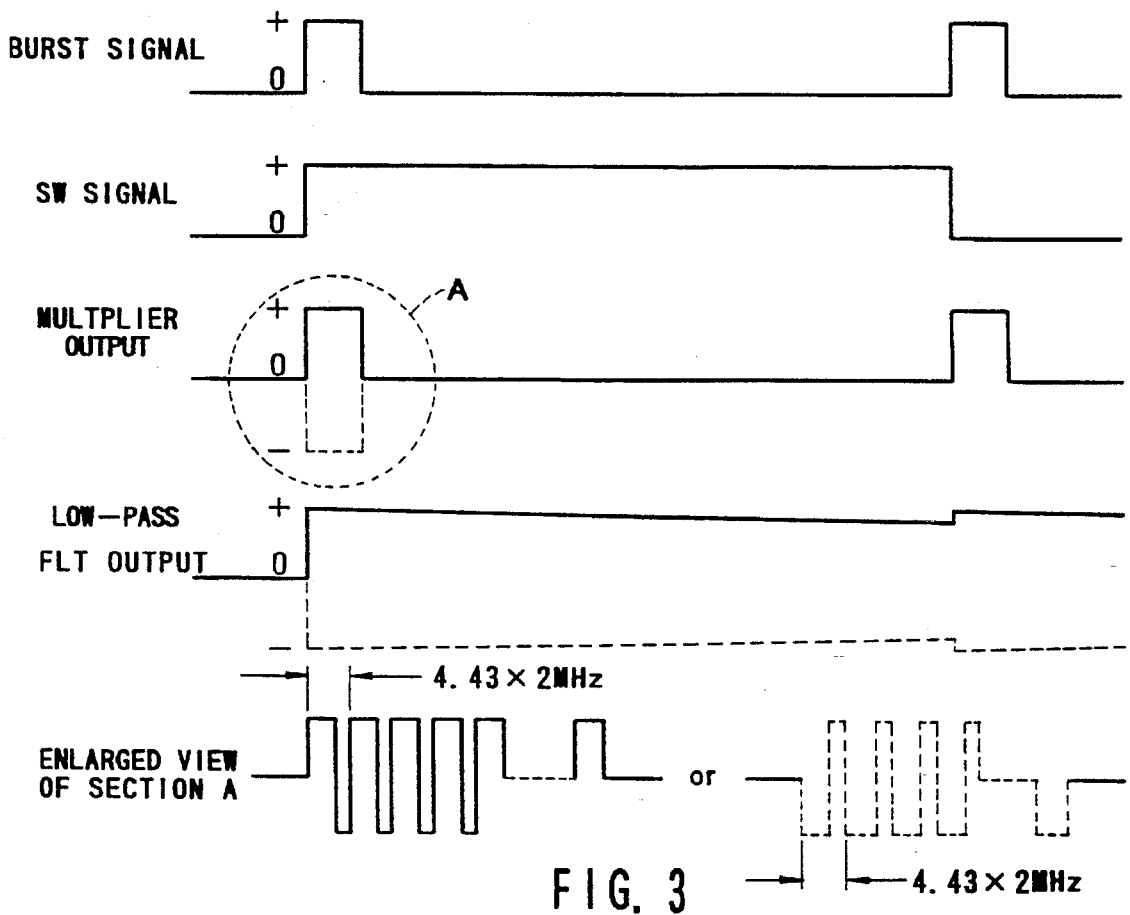
FIG. 3 is a timing chart showing the output waveforms of the burst signal, a switching pulse signal, an output of a multiplier and an output of a low-pass filter of the signal demodulating apparatus of the present invention.

FIG. 3 is a timing chart of the burst signal outputted by the burst gate 19, the switching pulse signal outputted by the switching pulse signal generator 20, the comparison result signal outputted by the multiplier 16, and the signal of the low-pass filter 15 (noise of the comparison result signal is eliminated).

The burst signal is a pulse signal generated for each horizontal line. This burst signal is inputted to the multiplier 16. The multiplier 16 multiplies the direct signal by the delay signal, as long as the burst pulse signal is being inputted.

The switching pulse signal generator 20 outputs and applies the switching pulse signal (for determining the timing at which the polarity of the output of the multiplier 15 is to be reversed) to the multiplier 16.

The multiplier 16 effects the multiplication, during the time duration in which the switching pulse signal is being outputted, and outputs the signal whose polarity is reversed in accordance with the switching pulse signal. The polarity (shown by either of a solid line or a dotted line) of the signals outputted from the multiplier 16 and the low-pass filter 15 is decided by the design of them.

The output of the multiplier 16 includes high frequency noise. This high frequency noise is eliminated by the low-pass filter 15 and further smoothed before being outputted by the low-pass filter 15.

The above-mentioned embodiment has been described by way of example, so that the embodiment will not limit the present invention. For instance, there exists no problem even if the polarity of the output of the multiplier 16 is inverted. In more detail, when the direct signal is 135 degrees in phase, it is possible to lag the phase by setting the polarity to negative (−) as far as the delay signal phase leads and to positive (+) as far as the delay signal phase lags. Further, in this embodiment although the multiplier is used as a phase detector, any other means can be adopted as far as the phases between the delay signal and the direct signal can be compared with each other.

What is claimed is:

1. A signal demodulator apparatus, comprising;

an input terminal for inputting a phase alternation line (PAL) chroma signal;

delaying means connected to said input terminal, for outputting a first delay signal obtained by delaying the PAL chroma signal by a time corresponding to one horizontal line;

a phase corrector responsive to the first delay signal outputted by said delaying means, for correcting phase of the first delay signal on the basis of a phase difference detection signal and outputting the first phase-corrected delay signal as a second delay signal;

a phase difference detector for detecting a phase difference between the second delay signal outputted by said phase corrector and the PAL chroma signal inputted through said input terminal and for outputting the phase difference detection signal to said phase corrector to correct the phase difference to a time corresponding to one horizontal line;

a multiplier responsive to the second delay signal outputted by said phase corrector and the PAL chroma signal inputted through said input terminal, for obtaining and outputting the phase difference between the second delay signal and the PAL chroma signal;

polarity reversing means for reversing polarity of the phase difference signal outputted by said multiplier for each predetermined periodic time; and a filter responsive to the phase difference signal outputted by said multiplier, for eliminating noise components for the phase difference signal to generate and output a correction signal to said phase corrector.

2. The signal demodulating apparatus of claim 1, wherein said polarity reversing means comprises:

a burst gate for inputting a burst signal to said multiplier; and a switching pulse signal generator for inputting a switching pulse signal indicative of timing at which the polarity of the phase difference signal is reversed, to said multiplier.

3. The signal demodulating apparatus of claim 2, wherein said multiplier multiplies the second delay signal by the PAL chroma signal during a time duration in which the burst signal is being applied from said burst gate, to obtain a phase difference signal, reverses the polarity of the phase difference signal on the basis of the switching pulse signal applied by said switching pulse signal generator, and outputs the polarity-reversed phase difference signal.

4. The signal demodulating apparatus of claim 1, wherein said polarity reversing means reverses the polarity of the phase difference signal for each horizontal line.

* * * * *